United States Patent
Bouti

[19]
[11] Patent Number: 6,089,468
[45] Date of Patent: Jul. 18, 2000

[54] NOZZLE TIP WITH WELD LINE ELIMINATOR

[75] Inventor: Abdeslam Bouti, Swanton, Vt.

[73] Assignee: Husky Injection Molding Systems Ltd., Canada

[21] Appl. No.: 09/435,965

[22] Filed: Nov. 8, 1999

[51] Int. Cl.$^7$ .................................................. B05B 17/04
[52] U.S. Cl. .......................... 239/11; 239/139; 239/461; 239/489; 239/533.1; 239/590.5; 239/591; 239/397.5
[58] Field of Search ..................................... 239/461, 487, 239/488, 489, 482, 463, 483, 533.1, 590, 590.3, 590.5, 591, 11, 5, 397.5; 425/564, 568

[56] References Cited

U.S. PATENT DOCUMENTS

| | | |
|---|---|---|
| 137,881 | 4/1873 | Berryman et al. . |
| 239,630 | 4/1881 | Walter . |
| 982,106 | 1/1911 | Thornycroft . |
| 1,469,479 | 10/1923 | Kent . |
| 1,514,456 | 11/1924 | Gould . |
| 1,882,241 | 10/1932 | Curran . |
| 1,979,577 | 11/1934 | Sigwald . |
| 3,486,700 | 12/1969 | Bristow . |
| 3,743,187 | 7/1973 | Breunsbach . |
| 3,788,557 | 1/1974 | Breunsbach . |
| 4,014,469 | 3/1977 | Sato . |
| 4,266,723 | 5/1981 | Diaz . |
| 4,279,588 | 7/1981 | Gellert . |
| 4,965,028 | 10/1990 | Maus et al. . |
| 5,405,258 | 4/1995 | Babin . |
| 5,513,976 | 5/1996 | Mcgrevy . |
| 5,545,028 | 8/1996 | Hume et al. . |
| 5,783,234 | 7/1998 | Teng . |
| 5,849,343 | 12/1998 | Gellert et al. . |
| 5,900,200 | 5/1999 | Teng . |

FOREIGN PATENT DOCUMENTS

| | | |
|---|---|---|
| 231696 | 6/1963 | Australia . |
| 0546554 | 6/1993 | European Pat. Off. . |
| 0638407 | 2/1995 | European Pat. Off. . |
| 3201710 | 8/1982 | Germany . |
| 3249486 | 6/1984 | Germany . |

OTHER PUBLICATIONS

"Analysis for Extrusion Die Design" by B. Proctor, SPE ANTEC, Washington, D.C., pp. 211–218 (1971).
"The Nuts and Bolts of Blown–Film Design" by C. Rauwendaal, Plastics World, pp. 85–87 (1991).

*Primary Examiner*—Andres Kashnikow
*Assistant Examiner*—Christopher S. Kim
*Attorney, Agent, or Firm*—Bachman & LaPointe, P.C.

[57] ABSTRACT

A flow channel is provided in a nozzle housing for resin flow, said flow channel having an inlet area for receiving resin and an outlet area for transferring resin to a mold cavity. An elongated shaft extends in the flow channel. At least one spiral groove is provided in the flow channel facing the shaft that decreases in depth towards the outlet area.

36 Claims, 7 Drawing Sheets

NOZZLE TIP WITH WELD LINE ELIMINATOR

BACKGROUND OF THE INVENTION

Hot runner injection nozzles having torpedoes or valve stems in the melt stream typically create weld line blemishes in the finished part caused by the melt stream being divided by these obstructions and having to reform downstream thereof. The present invention provides an improved injection nozzle and method which includes an improved flow channel geometry to eliminate or significantly minimize these weld lines, while at the same time permitting faster color change performance.

When plastic melt flows through a hot runner system en route to a mold cavity, it sometimes must separate from a single solid cylindrical flow mass to pass by obstructions, such as torpedos, support fins and blades, valve stems, stem guides or support blades. When thus divided, the disturbed melt stream recombines downstream of the obstruction and there forms at least one weld line as the melt streams from the divergent paths come back together. Such a weld line, unless remixed homogeneously, thereafter continues to be present in the melt stream and appears as a blemish or line in the molded part formed from the mold cavity. Also when changing color of the melt considerable amounts of resin are wasted in flushing out the old color that is caught or stuck to these flow obstructions.

U.S. Pat. No. 4,266,723 to Osuna-Diaz and U.S. Pat. No. 4,279,588 to Gellert are examples of heat conducting torpedos. German Patent DE 32 49 486 to Manner and European Patent 0 638 407 to Krummenacher show valve stems being guided by nozzle tips having fins extending into the melt stream. All of these are examples of melt flow obstructions.

U.S. Pat. No. 5,405,258 to Babin shows a hot runner nozzle having a torpedo which is used to conduct heat absorbed from the upstream melt along its length to the gate area. The torpedo is positioned within the melt stream and supported by spiral blades that induce a swirling motion to the melt as it flows past them to help provide a stronger product in the gate area. The melt stream divides from a cylindrical stream upstream of the torpedo to an annular stream to pass the torpedo. It is also subdivided in the said annular stream to pass either side of the multiple spiral blades. Downstream of the blades the melt recombines briefly in the annular channel forming weld lines that may appear as lines in the molded part.

U.S. Pat. No. 5,849,343 to Gellert et al. shows a valve gated nozzle having a stem guiding nozzle tip that causes the melt to divide from a cylindrical flow to annular flow first to negotiate the valve stem, then to divide again to negotiate the spiral fins supporting the stem at the tip. As in the '258 torpedo version, the melt must subdivide to pass by the spiral blades and recombine again.

The recombination of the flow in all of the foregoing examples typically causes weld lines to appear in the molded part; also color changing becomes lengthy and expensive.

Several attempts at mixing the melt in hot runner nozzles are shown in U.S. Pat. No. 4,965,028 to Maus et al., U.S. Pat. No. 5,513,976 to McGrevy, European Patent 0 546 554 to Gellert, and German Patent DE 32 01 710 to Gellert. A spiral fluted mixer included in an injection molding machine nozzle is shown in Austrian Patent 231696 to Hehl. All of these examples subdivide the melt stream into discrete paths that must recombine downstream of the obstruction and this tends to create flow blemishes in the molded part.

U.S. Pat. No. 5,545,028 to Hume et al. shows a hot runner tip having a semi-torpedo style in which the outer surface of the torpedo includes a flow channel that converts a single cylindrical inlet flow to an annular flow passing by the tip. However, the '028 patent does not show: grooves on the internal side of the tip body, any initial gap or clearance to eliminate hang-ups, a relaxation zone to reduce residual stresses from flow conversion in a grooved section, or a flow restriction or conformation zone to reduce the thickness variation generated in a grooved zone.

In spiral mandrel dies used in extrusion molding, single or multiple incoming cylindrical melt streams can be converted to a single annular outflowing stream in a continuous process like blown film extrusion molding. U.S. Pat. Nos. 5,783,234 and 5,900,200 to Teng show one application of this in a hot runner valve gated nozzle in which the spiral elements are formed in a comparatively large diameter valve stem and positioned relatively distant from the mold cavity gate. Reference should also be had to the following references: "Analysis for Extrusion Die Design" by B. Proctor, SPE ANTEC, Washington, D.C., pages 211–218 (1971); "The Nuts and Bolts of Blown-Film Design" by C. Rauwendaal, Plastics World, pages 85–87 (1991); and "Extrusion Dies for Plastics and Rubber" by W. Michaeli, Carl Hanser Verlag, Munich, ISBN 3-446-16190-2 (1992).

It is, therefore, a principal object of the present invention to provide an improved injection nozzle and method.

It is a further object of the present invention to provide an improved nozzle and method as aforesaid which eliminates or significantly minimizes weld lines in the finished product.

It is a still further object of the present invention to provide an improved nozzle and method as aforesaid which permits fast color change performance.

Further objects and advantages of the present invention will appear hereinbelow.

SUMMARY OF THE INVENTION

In accordance with the present invention, the foregoing objects and advantages are readily obtained.

The injection nozzle of the present invention comprises: a flow channel for resin flow having an inlet area for receiving molten resin, an outlet area for transferring molten resin to a mold cavity and an outer surface thereof; an elongated shaft extending in the flow channel, as a movable valve stem or a valve stem guide or a torpedo, adjacent the outlet area; at least one spiral groove formed in the outer surface of the flow channel and facing the shaft that decreases in depth towards the outlet area, with lands adjacent said groove that increase in clearance towards the outlet area, with said groove desirably cut into the outer surface of the flow channel, wherein a helical flow path of resin is provided through the spiral groove and an axial flow path of resin is provided over the lands. The shaft may be a torpedo or a valve stem or a valve stem guide. Preferably, a sleeve is provided in the flow channel adjacent the elongated shaft, wherein the groove is formed in the sleeve. A portion of the lands are generally bonded, press-fit or taper locked or seated to the shaft and the lands increase in clearance with respect to the shaft towards the outlet area.

The injection molding method of the present invention comprises: supplying molten resin to a flow channel having an outer surface thereof in an injection nozzle, which flow channel extends in said nozzle from an inlet area to an outlet area for transferring said molten resin to a mold cavity; providing an elongated shaft in the flow channel adjacent the outlet area; transferring the molten resin to at least one spiral groove, with lands adjacent said groove, said groove formed in the outer surface of the flow channel, and transferring the resin from the groove to the outlet area; decreasing the depth of the groove towards the outlet area and increasing the clearance of the lands towards the outlet area; thereby flowing the resin in a helical flow path through the spiral groove and in an axial flow path over the lands.

Further features of the present invention will appear hereinbelow.

BRIEF DESCRIPTION OF THE DRAWINGS

The present invention will be more readily understandable from a consideration of the accompanying illustrative drawings, wherein.

DETAILED DESCRIPTION OF PREFERRED EMBODIMENTS

In a spiral mandrel die used for extrusion molding the melt stream is first divided into several separate streams using a star shaped, or ring shaped distributor. The streams are then fed into separate spiraling channels cut into the mandrel like a multi-start thread. The depth of the channels constantly decreases and the gap between the mandrel and the inner die wall constantly increases in the direction of flow. This causes a flow stream initially confined within a closed spiral to divide into two streams as it emerges into the widening gap. One stream continues to flow in the spiral channel next to the mandrel wall continuing in a helical direction while a second stream flows over the land of the spiral channel divider and flows in an axial direction. As the spiral channel depth decreases more and more of the resin is added to the axial flow direction. Thus the flow stream gradually transforms from a helical flow direction to an axial flow direction without the creation of weld lines and with the increased mechanical homogeneity and uniformity of melt temperature. This function of operation is not taught by U.S. Pat. No. 4,965,028 which does not teach reducing the channel depth while increasing the wall clearance through the annular flow section of the tip.

When the spiral mandrel die design theory is applied to a hot runner nozzle tip it has been found that with the spiral channels cut into the outer surface of a torpedo insert weld lines are completely eliminated from the surface of the molded part next to the mold core surface, opposite the gate, while blemishes may still occur on the opposed surface formed next to the mold cavity surface adjacent the gate. This approach is shown in U.S. Pat. Nos. 5,783,234 and 5,900,200. In contrast, when the spiral channels are cut into the outer surface of the nozzle channel opposite the torpedo as in accordance with the present invention, the weld lines are completely eliminated from the surface of the molded part next to the mold cavity surface adjacent the gate while blemishes may still remain on the opposed surface formed next to the mold core surface opposite the gate. Since in most cases this mold cavity formed surface is the outside or shown surface of the molded part, this nozzle configuration represents a much preferred operation.

Analogously, in order to obtain a part having both surfaces free of weld lines, a nozzle tip configuration having spiral channels on both sides of the annular channel section is required as also contemplated in accordance with a preferred embodiment of the present invention.

Other variations on configurations will become apparent from the following detailed descriptions.

Figure 1:
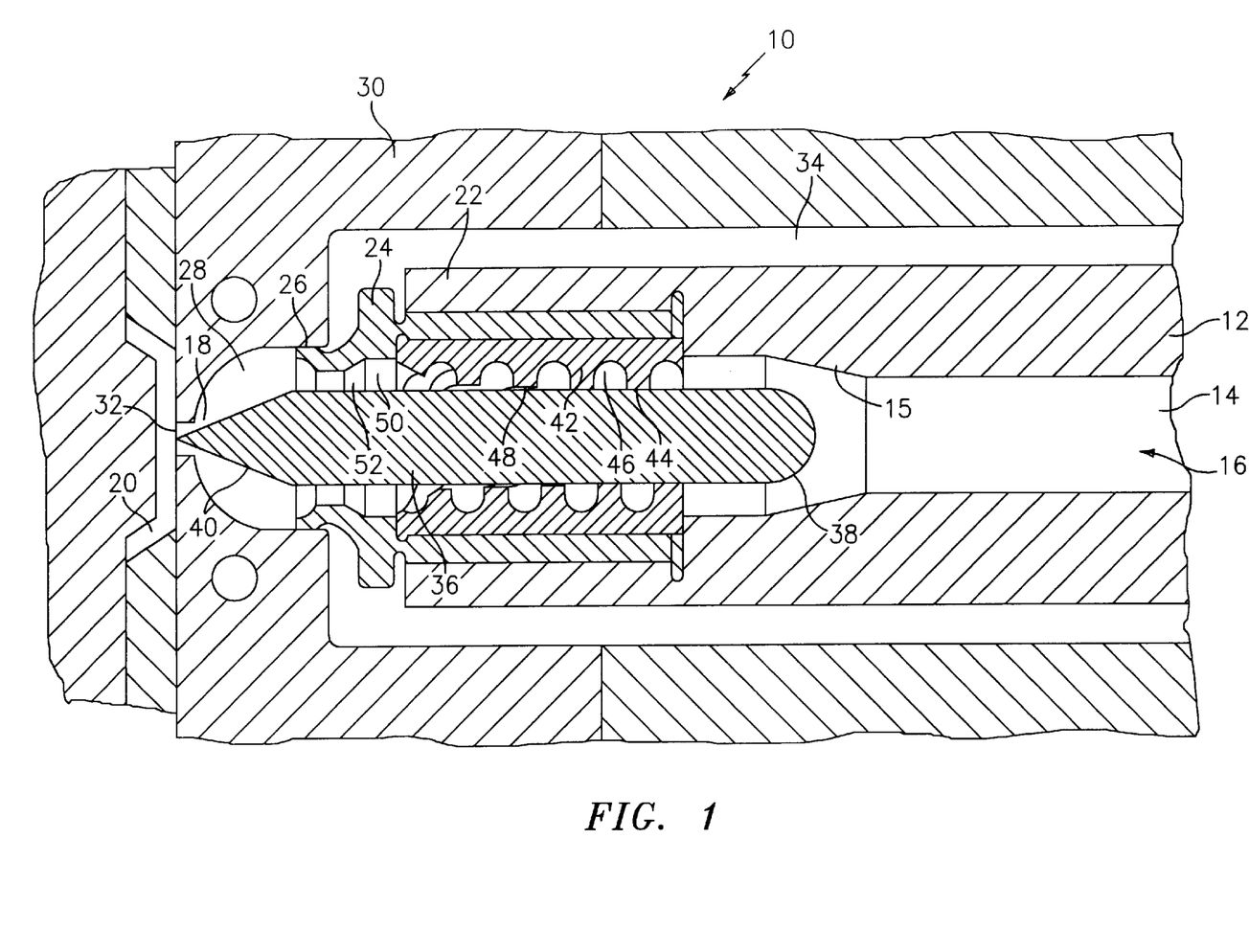
FIG. 1 is a partial sectional view of an exemplicative embodiment of the present invention.

Referring to FIG. 1, a torpedo style injection nozzle 10 is shown including a hot runner nozzle housing 12 and a cylindrical melt flow channel 14 in the housing. The flow channel 14 includes an outer surface 15 thereof, inlet area 16 for receiving molten resin and an outlet area 18 for transferring molten resin to mold cavity 20. Threaded into nozzle housing forward end or nozzle tip 22 is nozzle tip retainer 24, typically made of a thermal insulating material such as titanium, that also forms a seal 26 against the bubble area 28 of gate insert 30 such that molten resin flowing through the nozzle fills bubble area 28 before entering mold cavity 20 through gate 32. Seal 26 also prevents molten resin from leaking into insulating space 34 surrounding nozzle housing 12.

Elongated torpedo 36 is provided extending in flow channel 14 adjacent outlet area 18. Torpedo has a curved rear area 38 and a pointed forward area 40 extending to gate 32. Tip retainer 24 traps torpedo 36 in place by engaging sleeve 42 which is welded or brazed at bond area 44 to the torpedo. The torpedo is desirably made of a thermally conductive material such as beryllium copper or tungsten carbide, while the sleeve can be made of any hard wearing material such as steel or tungsten carbide, possibly manufactured by electrical discharge machining (EDM), powder metal molding, turning, broaching, casting and tapping or any other suitable process.

The outer surface of torpedo 36 is cylindrical. The exposed surface of sleeve 42 includes at least one spiral groove 46. Since the exposed surface of sleeve 42 at least in part forms the outer surface 15 of flow channel 14, the at least one spiral groove 46 is formed in the outer surface of the flow channel and as can be seen in FIG. 1 is cut into the outer surface of the flow channel. In addition, said spiral groove faces torpedo 36.

Lands 48 are provided adjacent said groove. The groove is formed so that it decreases in depth towards outlet area 18 and towards gate 32. Lands 48 are bonded to torpedo 36 at bond area 44 at the upstream end of sleeve 42. The lands 48 present an initial clearance and increase in clearance with respect to torpedo 36 towards outlet area 18 and towards gate 32. The initial clearance is an optional feature and is desirably at least 0.05 mm. This initial clearance is important for color change performance as it enables the flushing of any resin that may hang-up in the dead spots generated between the spiral grooves. Otherwise, the resin will tend to fill part of the small initial clearance and hang-up there for a longer period of time making color change very lengthy. Also, the resin may hang-up there until it degrades and bleeds back into the melt stream. However, with an initial clearance of at least 0.05 mm this abrupt, definite clearance at the end of the contact between the lands and the shaft enables part of the melt stream to flow in the circumference between the grooves to clean the dead spots.

In operation, therefore, the melt flows from the inlet end 16 of flow channel 14 towards outlet end 18 of flow channel 14 through the annular portion of the flow channel. The melt enters one or more of spiral grooves or channels 46 before reaching the outlet end 18. The spiral grooves induce a helical flow path to the melt. As the melt progresses towards the gate 32 progressively more and more of the melt spills over lands 48 as the lands increase in clearance and as the groove depth decreases so that the helical flow direction is gradually changed to an axial flow direction over the length of sleeve 42. At the end of the spiral groove section, the melt passes to first annular section 50 of flow channel 14 downstream of groove 46 which is comparatively large in diameter, and then passes to a further annular section 52 of channel 14 downstream of first annular section 50 which is reduced in diameter and which is located prior to the end of nozzle tip retainer 24 such that the melt stream is relaxed as it flows through annular section 50. The relaxation section helps to minimize stresses and any flow irregularities and homogenize the melt. Finally, the melt passes through gate 32 to fill the mold cavity 20.

The flowlines eliminator tip design can be defined by the following five zones:

A zone of adherence (torpedo version or stem guide) or sliding contacts (valve stem version) between the lands and the shaft may feature a tapered seat that locks the shaft to resist pressure action in the case of a torpedo. This zone provides the support and/or alignment for the torpedo or valve stem guide or guidance of the valve stem.

A zone of a finite initial gap or initial clearance that consists of an abrupt elimination of the contact between the sleeve lands and the shaft. This feature prevents resin hang-ups that may occur when the clearance increase starts from zero. The initial gap allows part of the melt to flow around and clean the dead spots generated between the grooves at the beginning of the clearance increase. The initial clearance value depends on the material processed and the process parameters (flow rate, etc.).

A zone of flow conversion where the melt stream is converted gradually into an annular flow without creating weld lines that will appear in the molded part. In this zone the depth of the grooves decreases gradually and the gap between the shaft and the lands increase gradually.

A relaxation zone that enables the polymer's molecules to relax from the stresses accumulated during the flow conversion in the previous zone. The relaxation zone can be used as well as a run-out for manufacturing tools.

A conformation zone that squeezes the melt through a tight annular section to reduce the thickness variations that may have been generated by the successive spill-overs that occurred during flow conversion. This zone can be an annular section that converges towards the gate if it is required by the application.

Figure 1A:
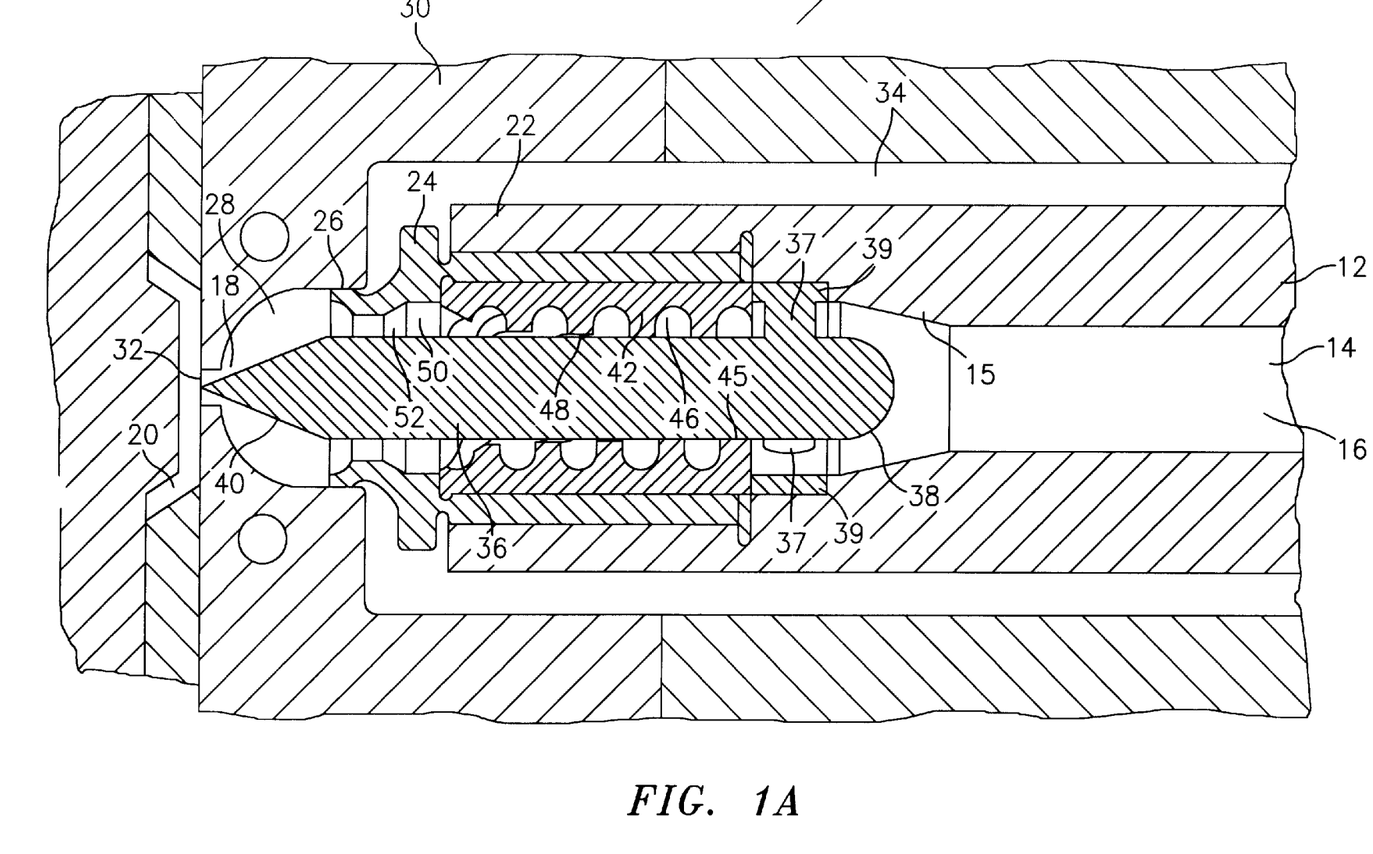
FIG. 1A is a partial sectional view of a further embodiment of the present invention.

The embodiment of FIG. 1A is similar to FIG. 1 wherein torpedo or shaft 36 includes one or more fins 37, as for example 2, 3, or 4 fins, which support the torpedo against nozzle housing 12. Fins 37 include an annular portion 39 which engage the nozzle housing. In the embodiment of FIG. 1A, the torpedo is not welded or brazed as at bond area 44 in FIG. 1, but simply engaged or press-fit at engagement area 45. Thus, a firm engagement is readily provided. As a further alternative, the torpedo can be used as a valve stem guide if it features a guiding hole or channel.

Figure 2:
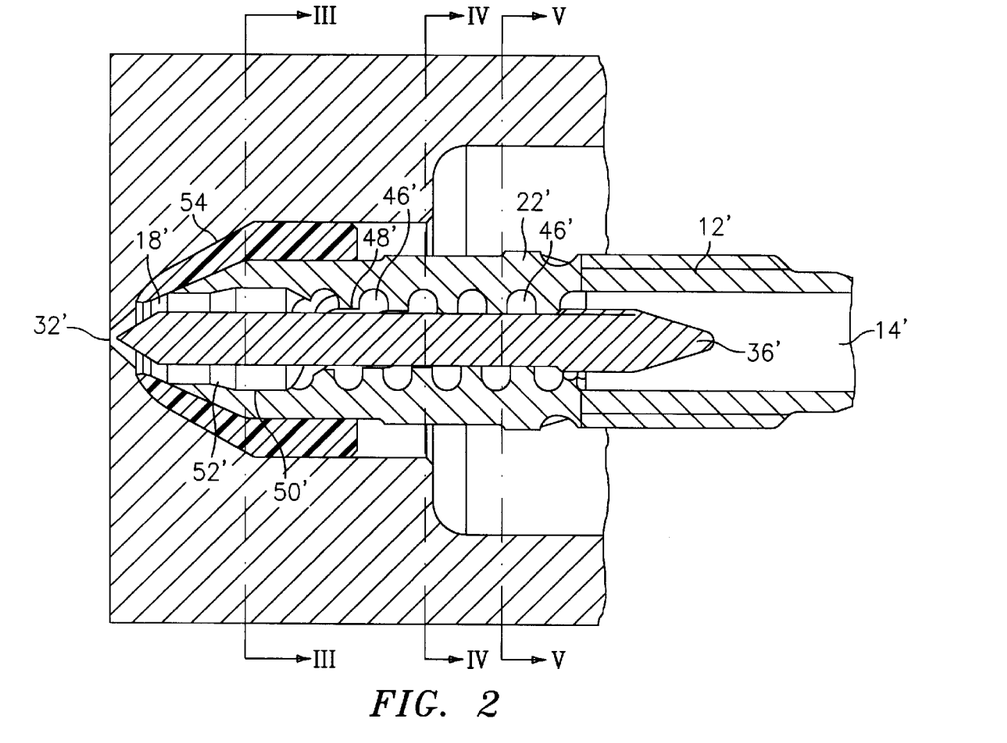
FIG. 2 is a sectional view of a further embodiment of the present invention.
Figure 3:
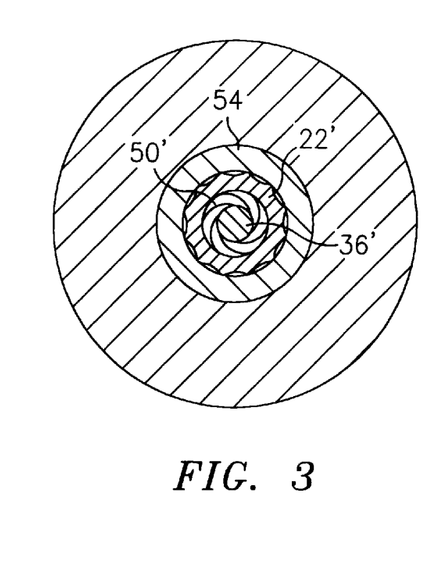
FIGS. 3, 4 and 5 are sectional views along lines III—III, IV—IV and V—V, respectively, of FIG. 2.
Figure 4:
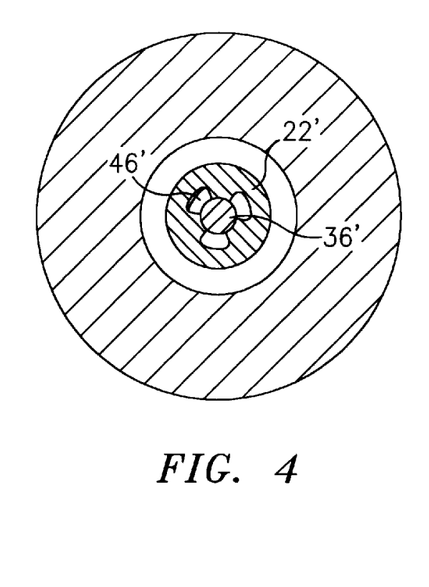
Figure 5:
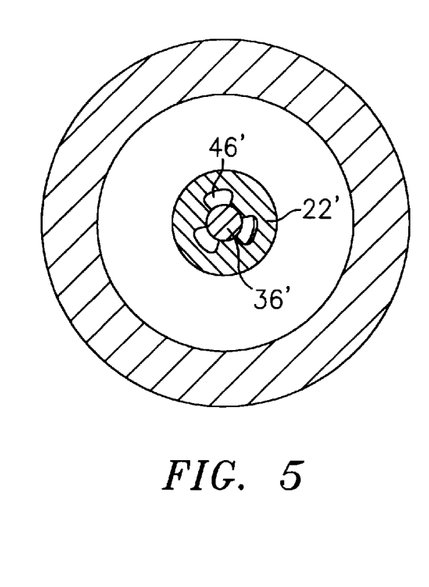

FIG. 2 shows a further embodiment of the present invention of a torpedo style injection nozzle wherein the nozzle tip retainer 24 from FIG. 1 has been eliminated and the spiral channels are formed directly in the nozzle housing or nozzle tip. Thus, FIG. 2 shows torpedo 36', nozzle housing 12' having a forward end or nozzle tip 22', flow channel 14' and gate 32'. In accordance with the embodiment of FIG. 2, spiral groove or channel 46', is formed directly in nozzle tip 22' which is made from a material such as beryllium copper, steel, tungsten carbide or other suitable material. The nozzle tip can if desired be threaded onto a separate nozzle housing. Nozzle tip 22' can be made for example by broaching, casting, tapping, turning, EDM, powder metal molding or any other suitable method. In addition, bubble area 28 has been eliminated by providing insulator 54 adjacent gate 32', which may be made of a suitable polymeric material. This effectively minimizes areas where melt can hang up and degrade. The conductive torpedo 36' is welded, brazed, press-fit or taper seated to nozzle tip 22' as in FIG. 1. FIGS. 3, 4 and 5 are sectional views along lines III—III, IV—IV and V—V, respectively, showing how the spiral groove geometry varies. Lands 48' are provided adjacent the groove 46'. In a manner after FIG. 1, the spiral groove decreases in depth towards the outlet area 18' and the lands increase in clearance from the torpedo towards the outlet area 18'. First annular section 50' and further annular section 52' are also provided as in FIG. 1.

Figure 6:
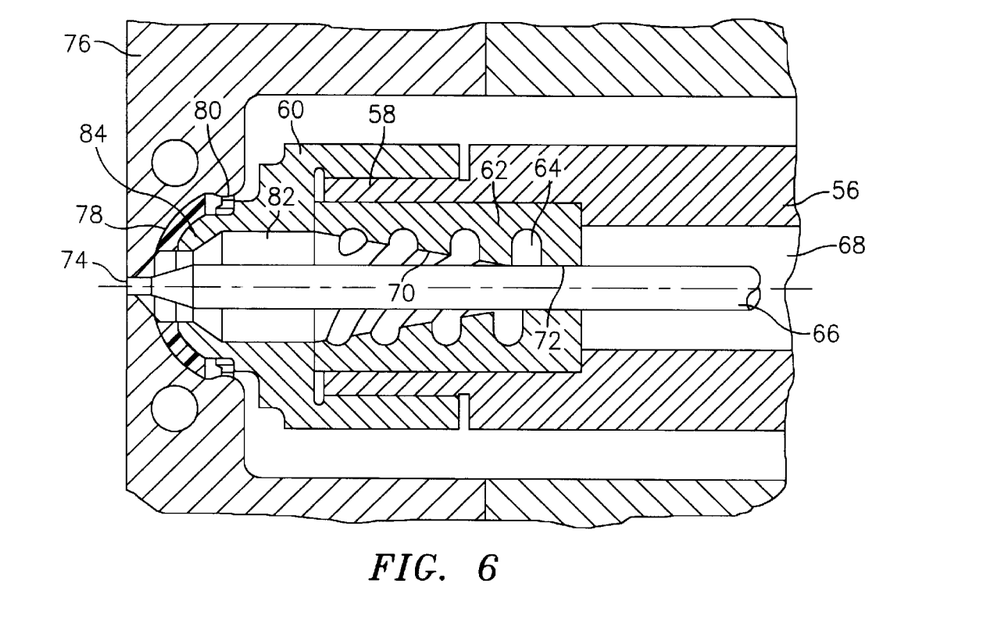
FIGS. 6, 7, 8 and 9 are partial sectional views of further embodiments of the present invention.

The embodiment of FIG. 6 shows the nozzle housing 56 with nozzle housing forward end or nozzle tip 58 including a threaded cap 60 that retains sleeve 62 in place. Spiral channels or grooves 64 are formed in sleeve 62. Sleeve 62 also acts as a guide for the movable valve stem 66 which is located in flow channel 68 where the valve stem is contacted by lands 70 at contact areas 72. Downstream of contact areas 72, the contact ceases as the spiral channel or groove depth decreases and the land clearance from the valve stem increases towards valve gate 74. Cap 60 is spaced from gate insert 76 by insulator 78 which may be made from a suitable polymeric material, and if desired this may be backed up with for example a titanium seal insulator 80.

In operation, when valve stem 66 is retracted by suitable motive means (not shown) the melt flows from the annular portion of flow channel 68 into one or more of spiral grooves or channels 64 which induce a helical flow path. As the melt progresses towards valve gate 74 more and more of the melt spills over lands 70 as the lands increase in clearance from the valve stem and as the groove depth decreases so that the helical flow direction is gradually changed to an axial flow direction over the length of sleeve 62. At the end of the spiral groove portion, there is a first annular section 82 of flow channel 68 which is comparatively large in diameter, followed by a further annular section 84 which has a reduced diameter such that the melt stream is relaxed as it flows through the first annular section. The relaxation section help minimize stresses accumulated by the melt during flow conversion and minimize any flow irregularities and homogenize the melt. The relaxation zone also may be used as a tool run-out for certain manufacturing processes such as tapping, turning, etc. Finally, the melt passes through gate 74 to fill the mold cavity.

Figure 7:
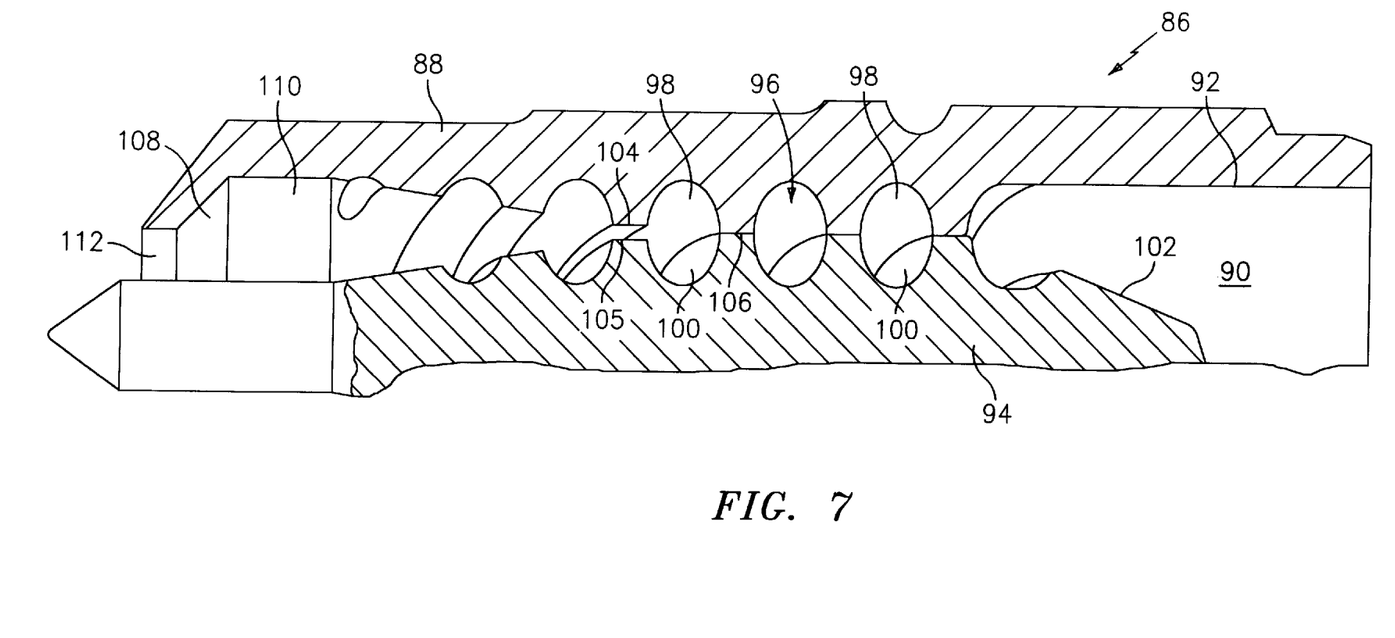

FIG. 7 shows a further embodiment of the present invention including dual spiral grooves or channels. In accordance with FIG. 7, injection nozzle 86 includes nozzle tip 88 and flow channel 90 including outer surface 92 thereof. Torpedo 94 is provided in the flow channel. A dual spiral groove or channel 96 is provided by forming an outer groove section 98 in nozzle tip 88 in the outer surface 92 of flow channel 90, and an inner groove section 100 in the adjoining outer surface 102 of torpedo 94 to form a substantially circular groove 96. Lands 104, 105 are provided adjacent the grooves. In accordance with FIG. 7, torpedo 94 is brazed or welded to nozzle tip 88 at upstream land contact areas 106. Naturally, other alignment features can be provided. For example, an alignment means may be provided to align the grooves of the sleeve with grooves of the torpedo, as for example a dowell pin. Thereafter, the depth of spiral channels 96 progressively decreases towards flow channel outlet area 108 and the clearance between lands 104, 105 gradually increases towards outlet area 108. Relaxation zone 110 and diameter reduction zone 112 are provided downstream of the spiral groove as in previous embodiments. The spiral grooves may also have different configurations, angles or opposite orientations, if desired.

In operation, as the melt progresses towards the gate end of the tip progressively more and more of the melt spills over the lands as they increase in clearance and as the groove depth decreases so that the helical flow direction is gradually changed to an axial flow direction. Because melt is spilling over the lands on both sides, there only remains helical flow in the edges of the channel until this too becomes converted to axial flow as the spiral channels blend away. Thus any melt imperfections associated with flow adjacent a smooth wall are eliminated on both sides of the molded part. The torpedo and tip can be the same or dissimilar materials made from for example beryllium copper, steel, tungsten carbide or any other suitable heat conductive abrasion resistant materials. Also possible is a one piece integral piece formed on one material by powder metal molding, lost core molding or any other suitable manufacturing method.

Figure 8:
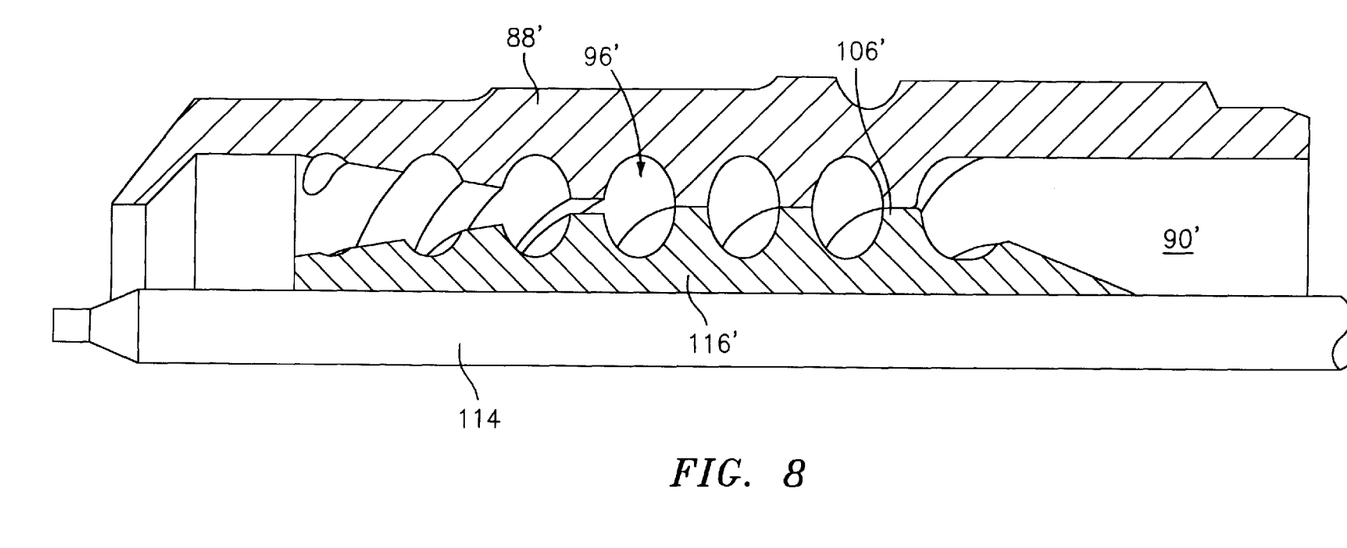

The embodiment of FIG. 8 is similar to FIG. 7 including a dual spiral groove or channel 96'. However, FIG. 8 includes movable valve stem 114 in a flow channel 90' slidably guided by torpedo insert 116. The torpedo insert is brazed or welded or engaged to nozzle tip 88' at land contact areas 106', as with an alignment feature, such as a dowell pin. This embodiment operates in a manner similar to FIG. 7.

Figure 9:
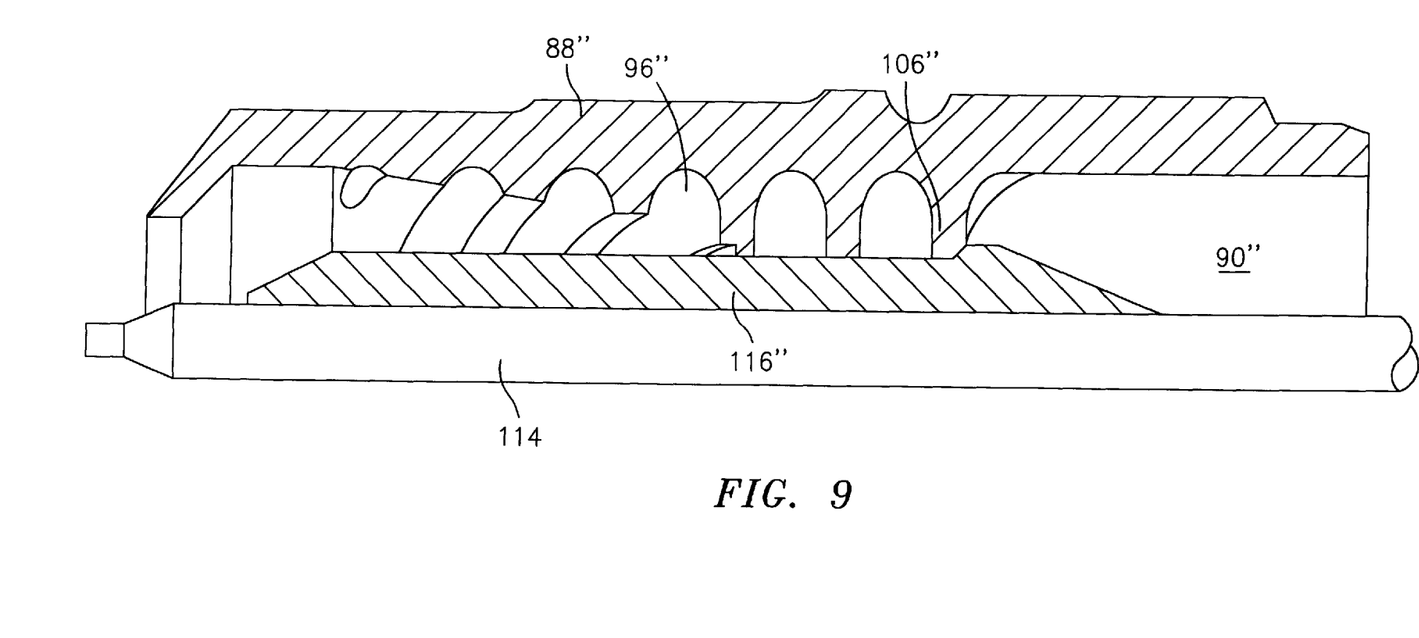

The embodiment of FIG. 9 is similar to FIG. 8 including a spiral groove or channel 96", movable valve stem 114 in flow channel 90" slidably guided by torpedo insert 116'. The torpedo insert is brazed or welded or engaged to nozzle tip 88" at land contact areas 106". However, in the embodiment of FIG. 9, the spiral groove or channel 96" is formed solely in nozzle tip 88" and the torpedo 116", without grooves, acts as a valve stem guide.

The various sealing and insulating details at the bubble and gate end of the nozzle are interchangeable between embodiments. Thus, for example, the nozzle tip retainer 24, polymeric insulator 54 and 78 and titanium seal insulator 80 can be employed in all versions.

The present invention is highly advantageous. Testing has demonstrated that the present invention eliminates weld lines, produces a homogeneous melt, and enables fast color changes and a stronger molded part, particularly in the gate area.

Significant features of the present invention include the spiral flow channels with their decreasing depth and increasing land clearance. The initial clearance with a finite length minimizes or eliminates possible hang-ups at the start of clearance. The initial clearance is a significant feature for color change performance as it enables the flushing of any resin that may hang-up in the dead spots generated between the spiral grooves. In case of the absence of initial clearance, the resin fills part of the small clearance and then hangs-up there for a longer time making color change very lengthy. The resin may also hang-up there until it degrades and bleeds back into the melt stream. The present invention eliminates or substantially minimizes flow lines especially if no initial clearance is provided. However, when an abrupt definite clearance is provided at the end of the contact between the lands and the shaft, it is possible to enable part of the melt stream to flow in the circumference between the grooves to clean the dead spots. In addition, a relaxation space is provided downstream of the spiral channels. The present invention is also suitable for use with both pin point torpedo, stem guiding torpedo, and sliding valve stem configurations and is particularly versatile.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An injection nozzle, which comprises:
    a flow channel for resin flow having an inlet area for receiving molten resin, an outlet area for transferring molten resin to a mold cavity, said flow channel including an outer surface thereof;
    an elongated member extending in the flow channel adjacent the outlet area; and
    at least one spiral groove formed in the outer surface of the flow channel and facing the elongated member that decreases in depth towards the outlet area, with lands adjacent said groove that increase in clearance towards the outlet area;
    wherein a helical flow path of resin is provided through the spiral groove and an axial flow path of resin is provided over the lands.

2. A nozzle according to claim 1, wherein said groove is cut into the outer surface of the flow channel.

3. A nozzle according to claim 1, including a gate in the outlet area for transferring resin to a mold cavity.

4. A nozzle according to claim 1, including a sleeve in the flow channel adjacent the elongated member, wherein said groove is formed in the sleeve.

5. A nozzle according to claim 4, wherein a portion of the lands are bonded to the elongated member and wherein the lands increase in clearance with respect to the elongated member towards the outlet area.

6. A nozzle according to claim 1, wherein said elongated member is a movable valve stem operative to permit and stop resin flow.

7. A nozzle according to claim 1, wherein said elongated member is a torpedo or valve stem guide.

8. A nozzle according to claim 1, including a first annular section of said flow channel downstream of said spiral groove.

9. A nozzle according to claim 8, including a further annular section of said flow channel downstream of said first annular section with a reduced diameter.

10. A nozzle according to claim 4, including a nozzle tip adjacent the outlet area of the flow channel and a nozzle tip retainer engaging the nozzle tip and holding the sleeve in place.

11. A nozzle according to claim 10, including a gate insert adjacent the outlet area of the flow channel which forms a bubble area adjacent said gate, wherein said nozzle tip retainer forms a seal against the bubble area.

12. A nozzle according to claim 1, including a nozzle tip adjacent the outlet area of the flow channel, wherein said spiral groove is formed in said nozzle tip.

13. A nozzle according to claim 1, wherein said helical flow path is gradually changed to an axial flow path.

14. A nozzle according to claim 1, wherein said spiral groove is formed in the outer surface of the flow channel and in the outer surface of said elongated member.

15. A nozzle according to claim 14, wherein said groove is substantially circular.

16. A nozzle according to claim 14, including a movable valve stem in the flow channel which is guided by a torpedo insert, with the spiral groove formed in the outer surface of the flow channel and in the outer surface of the torpedo insert.

17. A nozzle according to claim 1, including a movable valve stem in the flow channel which is guided by a torpedo insert, with the spiral groove formed solely in the outer surface of the flow channel.

18. A nozzle according to claim 1, including an initial clearance between the elongated member and the lands of at least 0.05 mm.

19. A nozzle according to claim 1, wherein said shaft includes at least one supporting fin.

20. An injection molding method, which comprises:

supplying molten resin to a flow channel having an outer surface thereof, in an injection nozzle, which flow channel extends in said nozzle from an inlet area to an outlet area for transferring said molten resin to a mold cavity;

providing an elongated member in said flow channel adjacent said outlet area;

transferring said molten resin to at least one spiral groove, with lands adjacent said groove, said groove formed in the outer surface of said flow channel, and transferring said resin from said groove to said outlet area; and decreasing the depth of said groove towards the outlet area and increasing the clearance of said lands towards the outlet area;

thereby flowing said resin in a helical flow path through the spiral groove and in an axial flow path over the lands.

21. A method according to claim 20, including transferring said resin from the spiral groove to a gate in the outlet area for transferring resin to a mold cavity.

22. A method according to claim 20, including transferring said resin to said groove which faces a movable valve stem operative to permit and stop resin flow.

23. A method according to claim 22, including transferring said resin to said groove which faces a torpedo or valve stem guide.

24. A method according to claim 22, including the step of cutting said groove in the outer surface of said flow channel.

25. A method according to claim 22, including the step of providing a sleeve in the flow channel adjacent the elongated member and forming said groove in said sleeve.

26. A method according to claim 25, including the step of bonding a portion of the lands to the elongated member and increasing the clearance of the lands with respect to the elongated member towards the outlet area.

27. A method according to claim 22, including transferring said resin from the spiral groove to a first annular section of said flow channel downstream of said spiral groove.

28. A method according to claim 27, including transferring said resin from said first annular section to a further annular section of reduced diameter.

29. A method according to claim 20, including providing a nozzle tip adjacent the outlet area of the flow channel, and forming said spiral groove in the nozzle tip.

30. A method according to claim 20, including gradually changing said flow path from a helical flow path to an axial flow path.

31. A method according to claim 20, including forming said groove in the outer surface of the flow channel and in the outer surface of said elongated member.

32. A method according to claim 31, including forming a substantially circular groove.

33. A method according to claim 30, including guiding a movable valve stem in the flow channel by a torpedo insert, and forming said groove in the outer surface of the flow channel and in the outer surface of the torpedo insert.

34. A method according to claim 20, including guiding a movable valve stem by a torpedo insert, and forming said groove solely in the outer surface of the flow channel.

35. A method according to claim 20, including the step of providing an initial clearance of at least 0.05 mm between the elongated member and the lands.

36. A method according to claim 20, including the step of providing said elongated member with supporting fins.

* * * * *